US012536361B1

(12) United States Patent
Liu et al.

(10) Patent No.: US 12,536,361 B1
(45) Date of Patent: Jan. 27, 2026

(54) NETWORK ASSIGNMENT BASED ON NON-DEFAULT DESIGN RULES

(71) Applicant: Cadence Design Systems, Inc., San Jose, CA (US)

(72) Inventors: Derong Liu, Austin, TX (US); Wing-Kai Chow, Austin, TX (US); Mehmet Can Yildiz, Austin, TX (US); Charles Jay Alpert, Cedar Park, TX (US)

(73) Assignee: Cadence Design Systems, Inc., San Jose, CA (US)

(*) Notice: Subject to any disclaimer, the term of this patent is extended or adjusted under 35 U.S.C. 154(b) by 714 days.

(21) Appl. No.: 18/045,026

(22) Filed: Oct. 7, 2022

(51) Int. Cl.
*G06F 30/3947* (2020.01)

(52) U.S. Cl.
CPC .............. *G06F 30/3947* (2020.01)

(58) Field of Classification Search
USPC ......................................................... 716/100
See application file for complete search history.

(56) References Cited

U.S. PATENT DOCUMENTS 11,132,489 B1 * 9/2021 Liu ........................ G06F 30/398
11,734,485 B1 * 8/2023 Posser .................. G06F 30/392
716/129

* cited by examiner

*Primary Examiner* — Bryce M Aisaka
(74) *Attorney, Agent, or Firm* — Schwegman Lundberg & Woessner, P.A.

(57) ABSTRACT

Various embodiments provide for assigning portions of a net based on one or more non-default design rules, which may be part of electronic design automation (EDA). For example, a net of a circuit design can be a clock network, and the assigning can comprise a layer assignment process, a track assignment process, or both. Additionally, various embodiments described herein can permit a plurality of non-default design rules to be applied to a single net of a circuit design.

20 Claims, 8 Drawing Sheets

NETWORK ASSIGNMENT BASED ON NON-DEFAULT DESIGN RULES

TECHNICAL FIELD

Embodiments described herein relate to circuit design and, more particularly, to systems, methods, devices, and instructions for assigning portions of a network (e.g., assigning portions of a network to layers and tracks) based on one or more non-default design rules, which may be part of electronic design automation (EDA).

BACKGROUND

Electronic design automation (EDA) software systems commonly perform layer and network assignment with respect to a circuit design, whereby a network (e.g., clock network) of the circuit design (or a portion thereof of the network) is assigned a specific layer and a specific track of the circuit design for routing. For example, given a two-dimensional (2D) global routing tree for a circuit design, layer assignment of the circuit design can divide the 2D global routing tree into a list of nodes and can assign those nodes onto routing layers, and track assignment of the circuit design can assign edges between nodes to different tracks of the routing layers.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
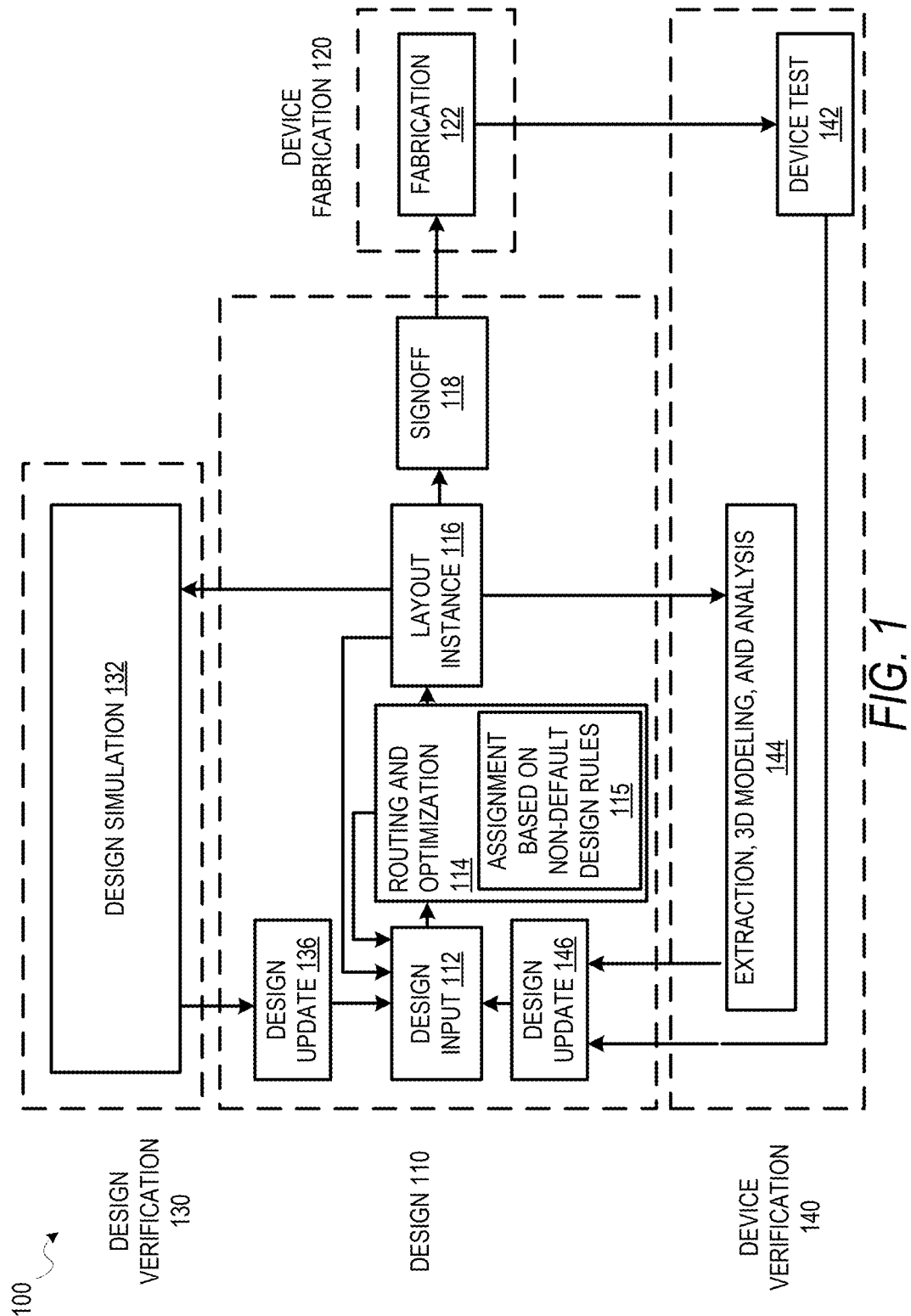
FIG. 1 is a diagram illustrating an example design process flow for assignment of a network of a circuit design based on one or more non-default design rules, according to some embodiments.

At present, networks (also referred to herein as nets) of a circuit design are routed and assigned (e.g., to layers and tracks) based on default design rules (DRs), based on non-default design rules (NDRs), where a default design rule is a design rule applied by default to a network of the circuit design in the absence of a corresponding non-default design rule being applied to the network. In certain instances, a non-default design rule has a larger value than a corresponding default design rule. Examples of design rules can include, without limitation, a rule specifying a minimum wire spacing between wires of a network, a rule specifying a minimum width of wires of a network, and a rule specifying a minimum length for wires of a network. Generally, routing processes (e.g., global and detailed routing) generate routing trees with edges that connect nodes of a network, where the edges represent wires (or a path for wires) that can eventually be fabricated to physically implement the network in a physical circuit. For conventional methodologies, once a non-default design rule is applied (e.g., assigned or associated with) to a network of a circuit design, the non-default design rule is uniformly applied to all edges of the network. Unfortunately, when a non-default design rule with a particularly large value is applied on a network of the circuit design, the wire capacitance can be higher with respect to edges closer to sink nodes of the network, and the higher capacitance can negatively impact timing and routing congestion of the network.

Various embodiments provide for assigning portions of a network based on one or more non-default design rules, which may be part of electronic design automation (EDA). For example, a network of a circuit design can be a clock network, and the assigning can comprise a layer assignment process, a track assignment process, or both. Additionally, various embodiments described herein can permit a plurality of non-default design rules to be applied a single network of a circuit design. In this way, various embodiments can balance a trade-off between timing and routing congestion when routing and assigning the single network of the circuit design. Additionally, where a plurality of non-default design rules are applied to a single network of a circuit design, various embodiments described herein can determine (e.g., identify) regions of the circuit design through which the single network passes, and can apply different non-default design rules from the plurality of non-default design rules to those regions. For instance, an embodiment can apply a larger-valued NDR to regions that include portions of the network closer to a source node (e.g., source pin) of the network and can apply a smaller-valued NDR that can include portions of the network closer to a sink node (e.g., sink pin) of the network.

As used herein, a clock network comprises a branching network to distribute a clock signal from a source node, which is coupled to a clock signal source within a circuit design, to a plurality of sink nodes, which is coupled to clock sinks within the circuit design. A clock sink usually comprises a circuit device in the circuit design that are designed to be clocked and thus needs a clock signal to operate. Examples of clock sinks include, without limitations, flip-flops or other sequential circuit devices that rely on a clock signal to synchronize their operations. A clock sink can receive a clock signal via a clock pin included by the clock sink.

As used herein, global routing can comprise determining a routing plan (e.g., one or more routing guides) for routing a physical wire (e.g., interconnect line or wire) within a circuit design between two or more nodes of circuit design (e.g., two pins or a source and a pin). For instance, global routing can route a wire (of a net of the circuit design) within the circuit design by dividing the circuit design (e.g., dividing each of one or more layers of the circuit design) into a grid of cells (e.g., grid cells), where each cell comprises a set number of resources (e.g., horizontal and vertical resources, such as tracks) for routing the wire. For some embodiments, each layer of a circuit design comprises its own grid of cells (e.g., grid cells). Global routing can consider/account for one or more routing blockages of the circuit design when determining a route plan for a wire within the circuit design.

Global routing can route a wire (of the net) by assigning the net to a set of specific grid cells and a set of specific layers (metal layers) of the circuit design. In doing so, global routing can generate a routing plan for the wire that describes a set of connected grid cells, between two or more nodes of the circuit design, that does not include obstructed cells. The routing plan (e.g., global routing plan) can comprise one or more routing guides that serve as "loose" routing paths or routing areas within which detailed routing can route a physical wire between two or more nodes (e.g., pins) of a circuit design.

As used herein, detailed routing can comprise routing a physical wire (e.g., interconnect wire) within a circuit design, between two or more nodes of the circuit design, based on a routing plan determined by global routing for the circuit design. The routing plan can provide a detailed routing process with a topology for routing wires, which in turn can enable detailed routing to route wires without violating one or more DRCs associated with a circuit design. This can be referred to as detailed routing being performed with clean DRCs. Accordingly, for some embodiments, global routing is performed on a circuit design prior to detailed routing being performed on the circuit design. Generally, global routing can be performed on a circuit design faster than performing detailed routing on the same circuit design. The routed wires of a circuit design can form a network of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for assignment of a network of a circuit design based on one or more non-default design rules, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floorplanning, placement, post-placement optimization, and post-routing optimization. As shown, the routing and optimization 114 operation includes an assignment based on non-default design rules 115 operation (hereafter, the assignment 115 operation), which may be performed in accordance with various embodiments described herein. For some embodiments, the assignment 115 operation can be performed prior to detailed routing of a circuit design, during (e.g., as part of) global routing of the circuit design, or between global routing and detailed routing of the circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in a fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

As described in more detail below, a design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2 through 5 are flowcharts illustrating example methods for assignment of a network (e.g., clock network) of a circuit design based on one or more non-default design rules, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
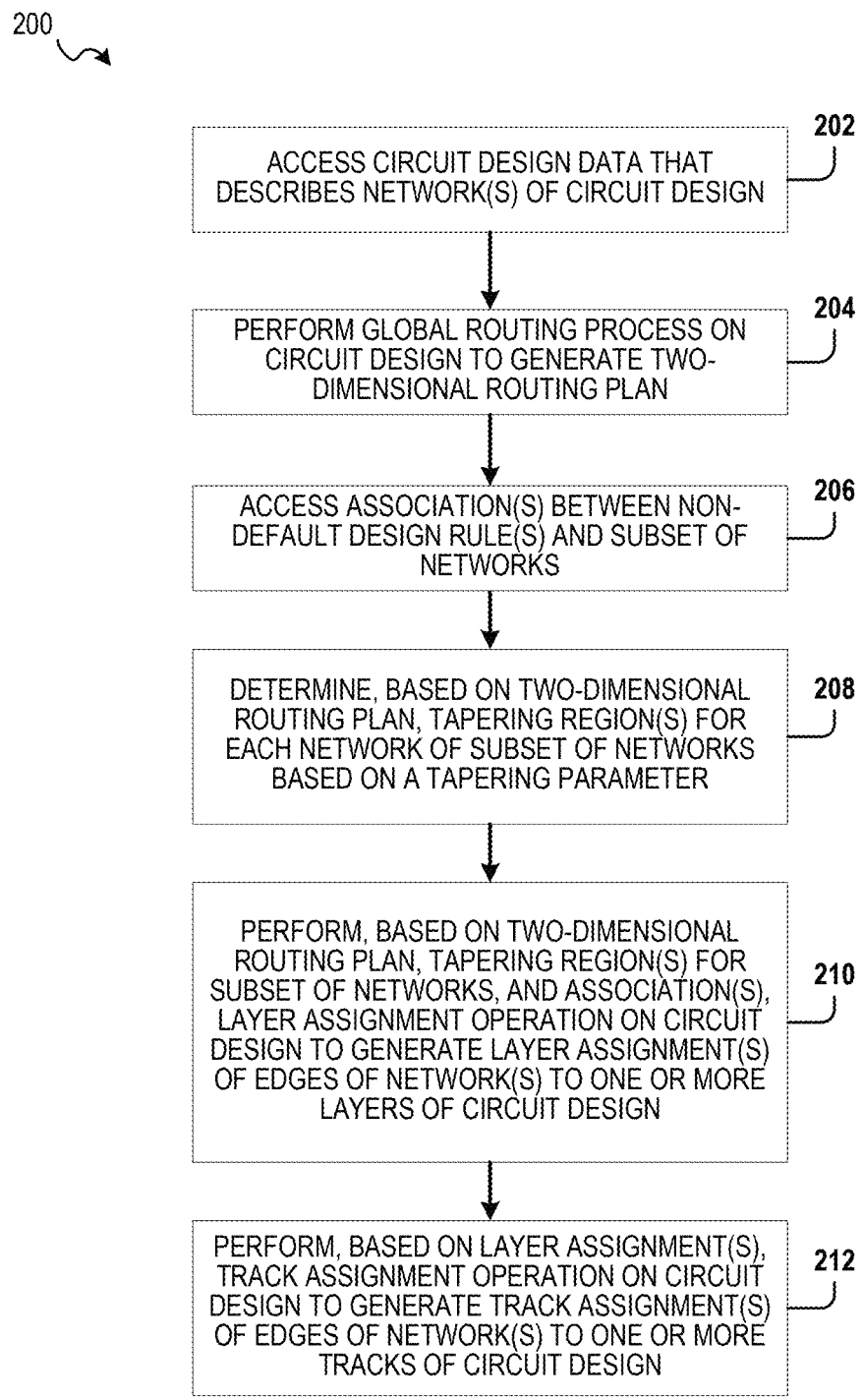
FIGS. 2 through 5 are flowcharts illustrating example methods for assignment of a network of a circuit design based on one or more non-default design rules, according to some embodiments.

Referring now to FIG. 2, the flowchart illustrates the example method 200 for assignment of a network of a circuit design based on one or more non-default design rules, according to some embodiments. For some embodiments, one or more operations of the method 200 are performed as part of a global routing process performed with respect to a circuit design (e.g., by an EDA software system), or performed between global routing and detailed routing of the circuit design. An operation of the method 200 (or another method described herein) may be performed by a hardware processor (e.g., central processing unit or graphics processing unit) of a computing device (e.g., desktop, server, etc.).

As illustrated, at operation 202, circuit design data is accessed, where the design data describes one or more networks (e.g., set of networks) of a circuit design. The circuit data can also describe a plurality of layers of the circuit design on which the one or more networks can be assigned. For some embodiments, the one or more networks includes one or more clock networks, that operatively couple one or more clock source nodes to one or more clock sink nodes. Thereafter, at operation 204, a global routing process is performed on the circuit design to determine (e.g., develop or generate) a two-dimensional routing (e.g., a two-dimensional routing topology) for the one or more networks of the circuit design. For some embodiments, the two-dimensional routing plan is expressed in grid cells (GCells) for routing the network. For some embodiments, the circuit design data comprises a plurality of pins (e.g., for sources or sinks) for a single network of the circuit design, and the two-dimensional routing plan is determined based on the plurality of pins. Additionally, for some embodiments, the two-dimensional routing plan comprises a two-dimensional routing tree.

The method 200 continues with operation 206 accessing one or more associations (e.g., set of associations) between one or more non-default design rules (e.g., set of non-default design rules) and a subset of the one or more networks (e.g., clock networks). Examples of non-default design rules can include a minimum spacing rule and a minimum width rule. For some embodiments, operation 206 comprises accessing a non-default design rule (NDR) array that is associated with at least the subset of networks, where one or more NDRs can be associated (e.g., assigned or applied to) a single network of the subset. For instance, the NDR array can comprise one or more vectors that associate (e.g., assign) a network identifier (e.g., net ID) of an individual network (e.g., an individual clock network) with one or more rule identifiers (e.g., rule IDs) that identify one or more NDRs. For some embodiments, where multiple NDRs are associated with an individual network, there is a preference to apply larger-valued NDR rules (e.g., larger width rules) to edges of the individual network that are closer to a source node of the individual network, and to apply smaller-valued NDR rules (e.g., smaller width rules) to edges of the individual network that are closer to a sink node of the individual network. In doing so, the wire capacitance can be kept lower on sink nodes of the individual network, which can help avoid negatively impacting timing and routing congestion of the individual network.

Depending on the embodiment, associations between one or more networks and one or more NDRs can be determined by (e.g., entered or provided by) a user as (e.g., circuit design parameters), who can for example populate an NDR array. An example of a NDR array is illustrated below with respect to Table 1. As shown, an individual network identifier can be associated with more than one rule identifier, thereby associating (e.g., assigning or applying) more than one NDR with the individual network. For instance, Table 1 illustrates that Net 1 is associated with a first non-default design rule NDR 1 and associated with a second non-default design rule NDR 2. As also shown, two different networks can share common NDRs.

TABLE 1

| Network ID | Rule ID |
|---|---|
| Net 1 | NDR 1 |
|  | NDR 2 |
| Net 2 | NDR 1 |
|  | NDR 3 |
| Net 3 | NDR 1 |
|  | NDR 2 |
|  | NDR 3 |

At operation 208, one or more tapering regions (e.g., a set of tapering regions) are determined for a network (e.g., each network) of the subset of networks based on the two-dimensional routing plan determined by operation 204 and based on a tapering parameter. One or more tapering regions for an individual network can serve to mark one or more portions (e.g., one or more edges) of the individual network for possible tapering, and can do so based on their distance (e.g., distance measured in steps, such as one, two, or three steps or units away from the source node) from a source node of the individual network. For some embodiments, the tapering parameter comprises a value that represents a maximum percentage (e.g., 30% or 20%) of the entire network that can be tapered or marked for tapering. Depending on the embodiment, the tapering parameter can be determined by (e.g., entered or provided by) a user (e.g., as a circuit design parameter).

According to some embodiments, determining one or more tapering regions for a single network based on the two-dimensional routing plan (or portion thereof for the single network) comprises: generating a set of distances for the single network by determining, based on the two-dimensional routing plan, a distance between each single edge of the single network and a source node of the single network; and determining the set of tapering regions for the single network by marking each single edge of the single network for tapering based on the tapering parameter and a distance of the single edge provided by the set of distances. For some embodiments, the edges of the single network are sorted (e.g., breadth-first search ordering) to generate a sorted set of edges, and individual edges are considered for marking as a tapering region based on (e.g., according to) the order in which they are sorted in the sorted set. In this way, some embodiments can stop marking edges of the single network as tapering regions once the edges are within a certain distance of the source node and/or a certain percentage of the single network has already been marked for tapering in view of the tapering parameter (e.g., a maximum of 30% of the overall network can be marked for tapering).

During operation 210, a layer assignment operation is performed on the circuit design based on the two-dimensional routing plan, the sets of tapering regions for the subset of networks, and the set of associations, where the layer assignment operation generates one or more layer assignments (e.g., a set of layer assignments) of edges of the one or more networks of the circuit design to one or more layers of the circuit design. The layer assignment can take the two-dimensional routing plan as an input, and can output a three-dimensional tree where an individual tree node is on a layer of the circuit design. According to various embodiments, edges of an individual network are assigned to layers of the circuit design based on different NDRs, routing congestion costs, timing costs, or some combination thereof. In particular, an embodiment can try multiple non-default design rules on edges of a single network marked as tapering regions, and can apply large-valued non-default design rules to source side edges and smaller-valued non-default design rules to the sink side edge.

For some embodiments, operation 210 comprises performing the following operations with respect to each select edge of an select network that has one or more associated NDRs: determining whether the select edge is marked for tapering based on the one or more tapering regions (determined by operation 208); based on the determining of whether the select edge is marked for tapering, assigning, from a subset of non-default design rules associated with the select network, a select non-default design rule for the select edge that either provides a best timing cost in comparison to all other non-default design rules in the subset (e.g., in response to edge being marked as a tapering region) or that provides a largest rule value in comparison to all other non-default design rules in the subset (e.g., in response to edge not being marked as a tapering region); generating a set of routing congestion costs of the select edge by determining, based on the select non-default design rule, a routing congestion cost for assigning the select edge to each layer of the circuit design; and determining a layer assignment for the select edge based on the set of routing congestion costs (e.g., the layer assignment that provides the lowest routing congestion cost). According to some embodiments, in response to the select edge being marked as a tapering region, the select non-default design rule assigned, from the subset of non-default design rules, to the select edge is one that provides a best timing cost in comparison to all other non-default design rules, and in response to the select edge not being marked as a tapering region, the select non-default design rule assigned is one that provides a largest rule value in comparison to all other non-default design rules in the subset. Eventually, a routing demand of each select edge of the select network can be updated, based on the layer assignment of the select edge and the select non-default design rule of the select edge, to generate a set of updated routing demands for layers of the circuit design. More regarding an example method for performing operation 210 is described and illustrated with respect to FIG. 5.

Additionally, during operation 212, a track assignment operation is performed on the circuit design (e.g., during or as part of detailed routing), based on the set of layer assignments generated by operation 210, to generate a set of track assignments of edges of the set of networks to one or more tracks of the circuit design. By operation 212, edges (e.g., wires) of networks of the circuit design associated with one or more non-default design rules can be assigned to tracks based on those non-default design rules. For some embodiments, operation 212 comprises performing the following operation with respect to each individual edge of an individual network that has one or more associated NDRs: assigning the individual edge to a track, of an individual layer assigned to the individual edge, based on an individual non-default design rule assigned to the individual edge. According to some embodiments, a circuit design layout is generated based on layer assignments provided by operation 210 and track assignments provided by operation 212.

Figure 3:
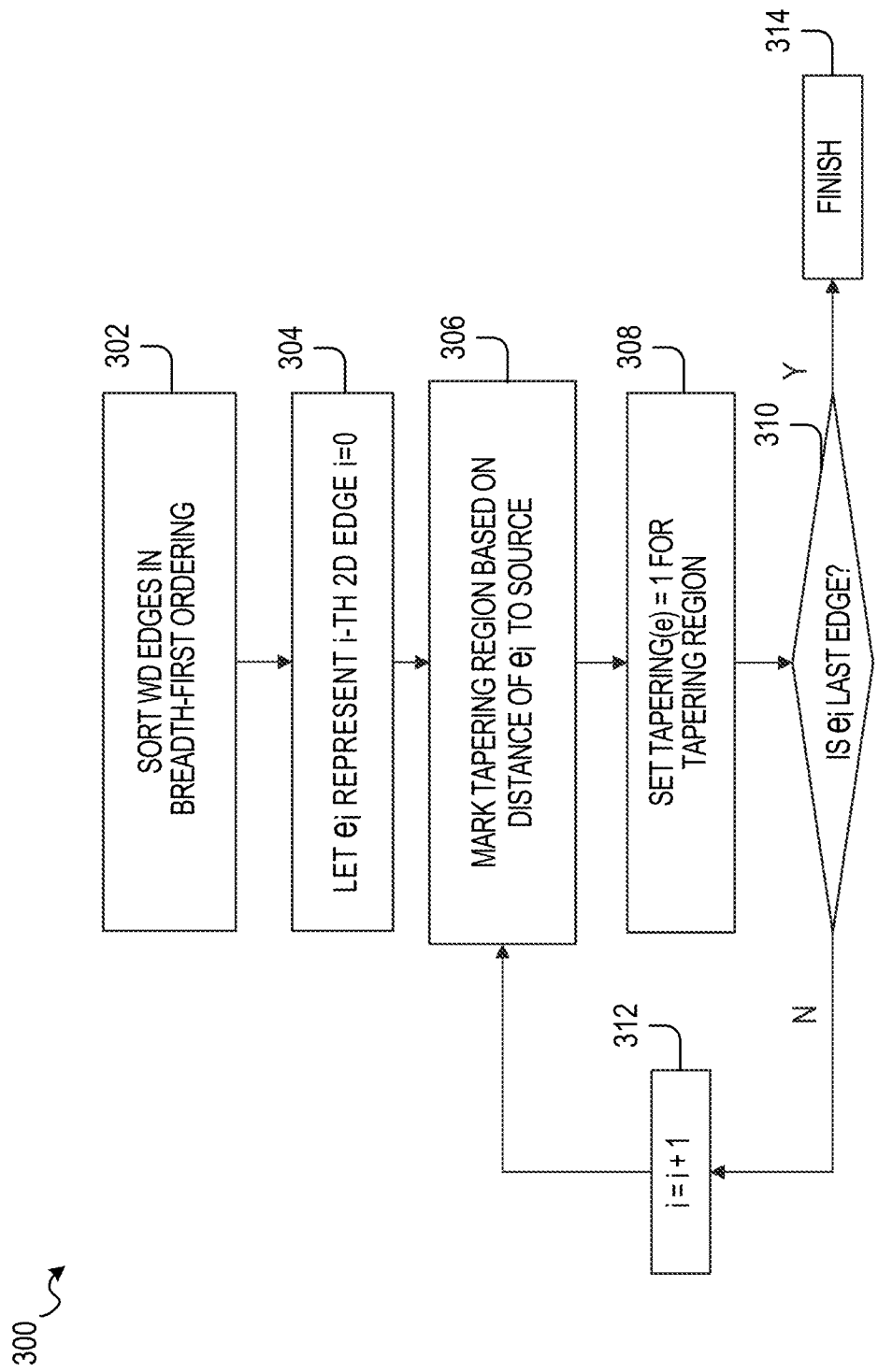

Referring now to FIG. 3, the flowchart illustrates the example method 300 for marking one or more edges of a network as tapering regions based on two-dimensional routing plan, according to some embodiments. For some embodiments, the method 300 is performed on a plurality of networks (e.g., clock networks) of the circuit design. Like the method 200 of FIG. 2, one or more operations of the method 300 are performed as part of a global routing process performed with respect to a circuit design (e.g., by an EDA software system). An operation of the method 300 may be performed by a hardware processor.

At operation 302, two-dimensional edges of a network, as described by a two-dimensional routing plan, are sorted based on breadth-first search ordering, thereby generating a sorted set of edges. Additionally, at operation 304, variable i is initialized to a value of 0, where edge $e_i$ is the i-th two-dimensional edge in the sorted set of edges. During operation 306, edge $e_i$ is marked as a tapering region based on a distance of edge $e_i$ to a source node of the network and further based on a tapering parameter, which can specify a maximum percentage of the network that can be tapered. Where the edge $e_i$ is marked as a tapering region by operation 306, then at operation 308, an indicator (e.g., flag) for the edge $e_i$, TAPERING($e_i$), is set to a value of one. Operation 310 determines whether the edge $e_i$ is the last edge, and if yes the method 300 finishes at operation 314, otherwise the method 300 proceeds to operation 312. At operation 312, the variable i is incremented by a value of one, and the method 300 returns to operation 306 for a next edge $e_i$ based on the incremented value of i.

Figure 4:
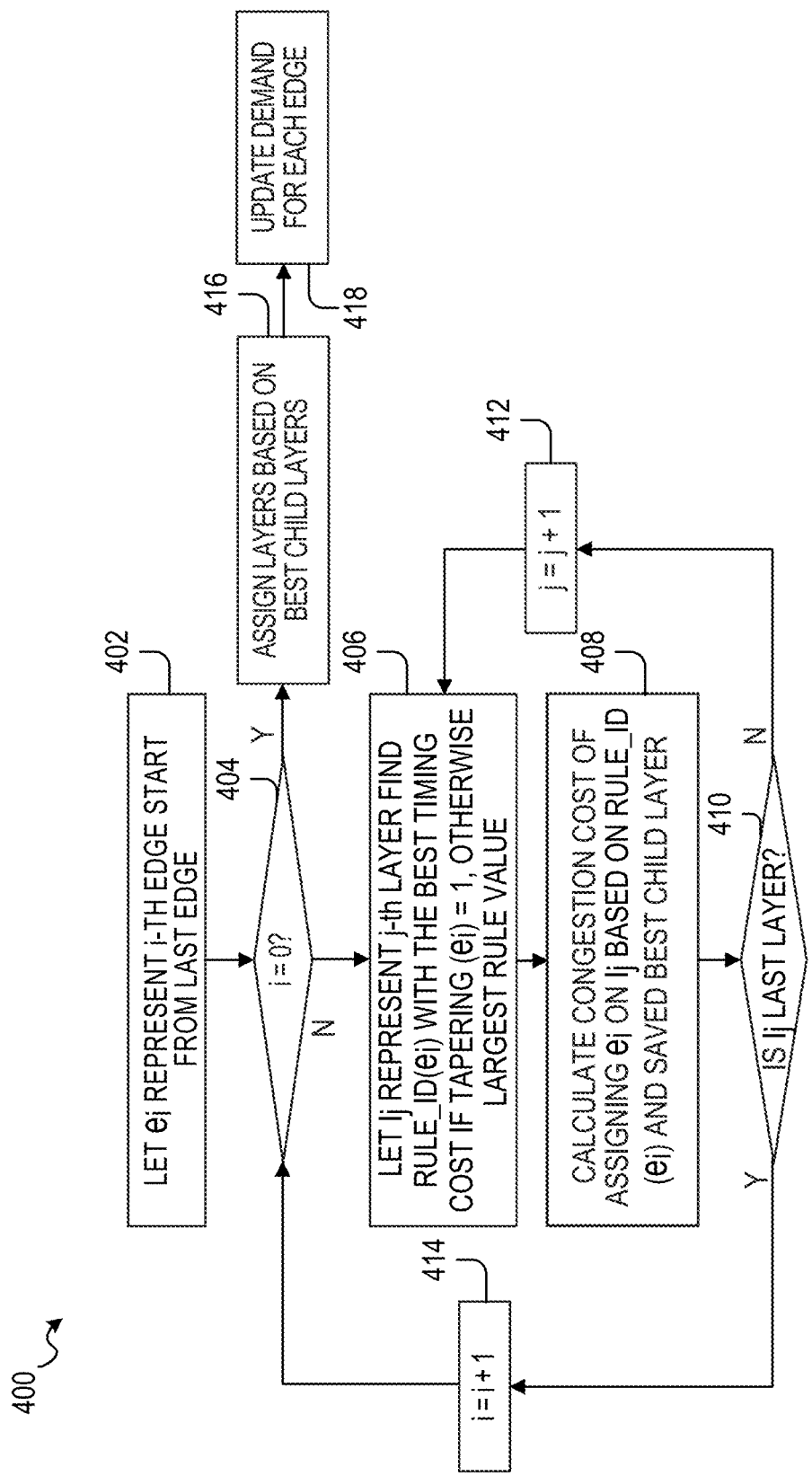

Referring now to FIG. 4, the flowchart illustrates the example method 400 for performing layer assignment of edges of a network based on tapering regions, according to some embodiments. For some embodiments, the method 400 is performed on a plurality of networks (e.g., clock networks) of the circuit design. Like the method 200 of FIG. 2, one or more operations of the method 400 are performed as part of a global routing process performed with respect to a circuit design (e.g., by an EDA software system). An operation of the method 400 may be performed by a hardware processor.

At operation 402, variable i is initialized to a value corresponding to a last edge (e.g., in the sorted set of edges) of the network, where edge $e_i$ is the i-th two-dimensional edge of the network. Operation 404 determines whether variable i is equal to 0, where i at 0 corresponds to the first edge of the network (e.g., in the sorted set of edges). If the variable i is equal to 0, the method 400 proceeds to operation 416, otherwise the method 400 proceeds to operation 406.

During operation 406, variable j is initialized to a value of 0, where layer $L_j$ represents a j-th layer of the circuit design. Additionally, operation 406 finds, from a set of non-default design rules associated with (e.g., assigned to) the edge $e_i$, a select non-default design rule associated with the edge $e_i$ (RULE_ID($e_i$)) that has the best timing cost if the edge $e_i$ has its indicator TAPERING($e_i$) set to one, and the select non-default design rule associated (RULE_ID($e_i$)) that has the largest rule value if the edge $e_i$ does not have its indicator TAPERING($e_i$) set to one (e.g., set to zero). The method 400 continues to operation 408, where a congestion cost is determined (e.g., calculated) of assigning the edge $e_i$ on the layer $L_j$ based on the select non-default design rule (RULE_ID($e_i$)) found by operation 406, and where a layer providing the best congestion cost thus far is saved as the current best child layer for the edge $e_i$. The method 400 continues to operation 410.

Operation 410 determines whether layer $L_j$ is the last layer of the circuit design to be considered, and if yes, the method 400 proceeds to operation 414, otherwise the method 400 proceeds to operation 412. During operation 414, the variable i is decremented by one and the method 400 returns to operation 404 to potentially consider layer assignments of a next edge $e_i$. At operation 412, the variable j is incremented by one and the method 400 returns to operation 406 to potentially consider assignment of the current edge $e_i$ to a next layer of the circuit design. in advanced technology nodes, layer (j+1) may or may not be in the same routing direction as layer j and, in such cases, some embodiments increment j by 2 at operation 412 to find the next layer with the same routing direction.

Eventually, at operation 416, individual edges of the network are assigned to layers of the circuit design based on the best child layers determined (via operation 408) for those individual edges. Thereafter, operation 418 updates routing demand of layers of the circuit design for each edge of the network based on (e.g., in view of applying to the edge) the corresponding select non-default design rule respectively found for the edge (e.g., found by operation 406).

Figure 5:
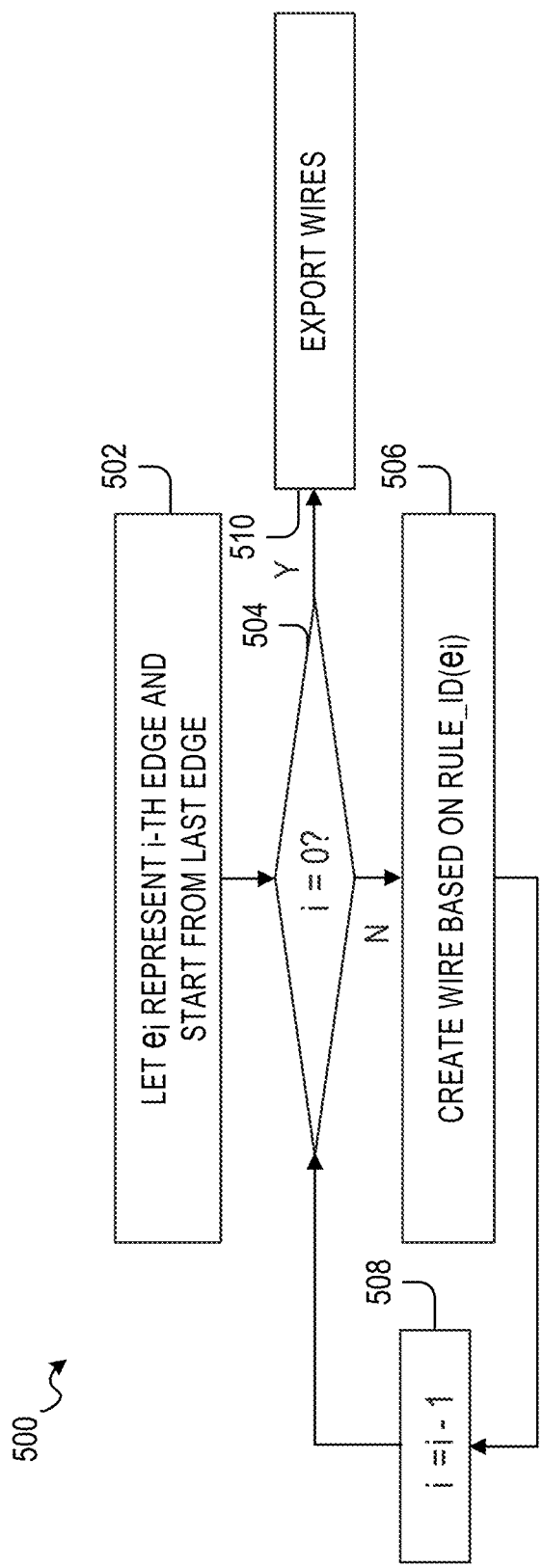

Referring now to FIG. 5, the flowchart illustrates the example method 500 for performing track assignment of edges of a network based on non-default design rules, according to some embodiments. For some embodiments, the method 500 is performed on a plurality of networks (e.g., clock networks) of the circuit design. Like the method 200 of FIG. 2, one or more operations of the method 500 are performed as part of a global routing process performed with respect to a circuit design (e.g., by an EDA software system). An operation of the method 500 may be performed by a hardware processor.

At operation 502, variable i is initialized to a value corresponding to a last edge (e.g., in the sorted set of edges) of the network, where edge $e_i$ is the i-th two-dimensional edge of the network. Operation 504 determines whether variable i is equal to 0, where i at 0 corresponds to the first edge of the network (e.g., in the sorted set of edges). If the variable i is equal to 0, the method 500 proceeds to operation 510, otherwise the method 500 proceeds to operation 506. During operation 506, the edge $e_i$ is assigned to a track and a wire is created on track based on (e.g., in view of applying to the edge) the select non-default design rule (RULE_ID ($e_i$)) found for the edge $e_i$ (e.g., found by operation 406 of the method 400 of FIG. 4). At operation 508, the variable i is decremented by one and the method 500 returns to operation 504 to potentially consider track assignment of a next edge $e_i$. Eventually, at operation 510, the wires created by operation 506 for the network are exported for the circuit design layout.

Figure 6:
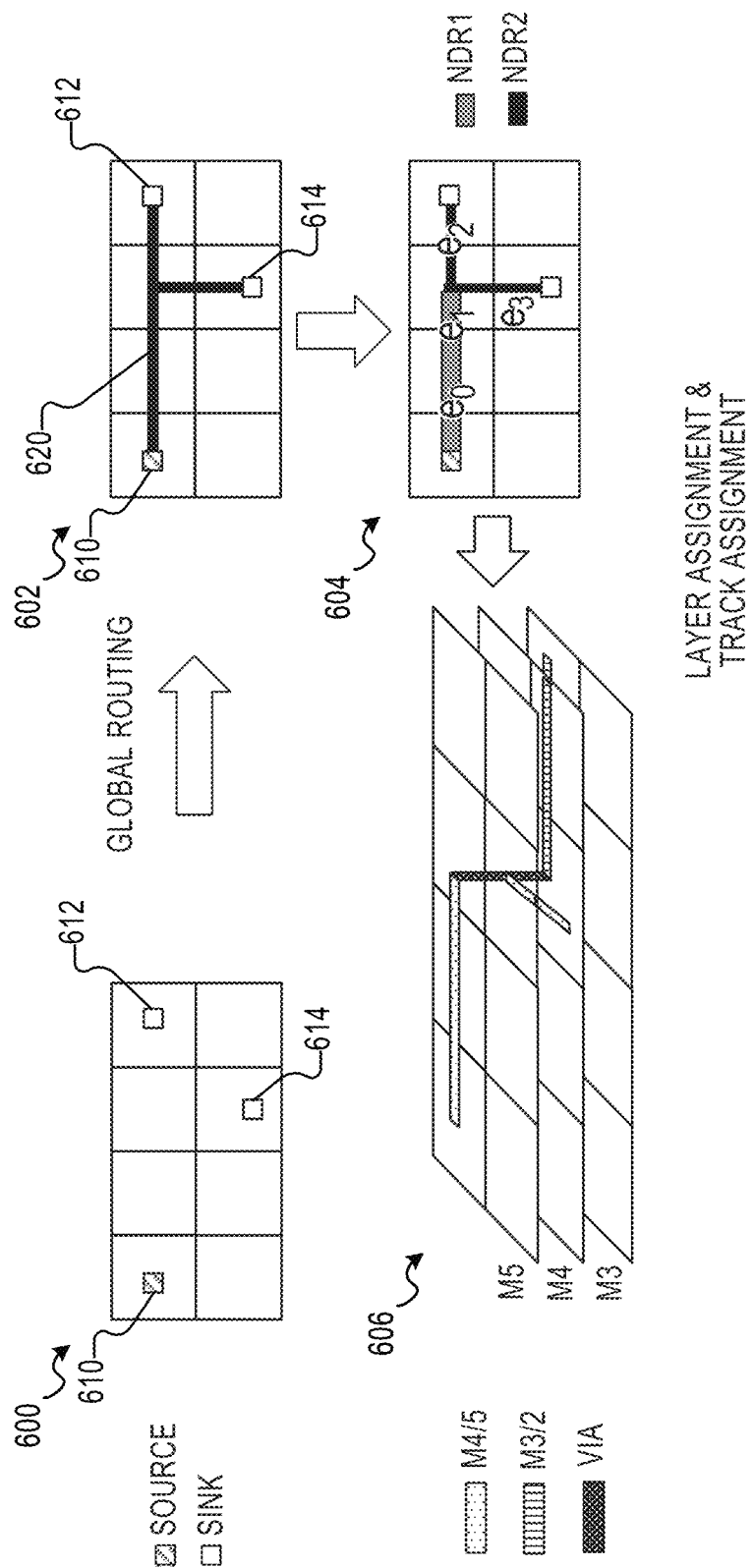
FIG. 6 is a diagram illustrating assignment of an example network of a circuit design based on one or more non-default design rules, according to some embodiments.

FIG. 6 is a diagram illustrating assignment of an example network of a circuit design based on one or more non-default design rules, according to some embodiments. In particular, schematic 600 illustrates a source node 610 (e.g., source pin) and sink nodes 612, 614 (e.g., sink pins) prior to global routing. Schematic 602 illustrates two-dimensional routing of the example network after performance of two-dimensional routing (e.g., global routing) on the example network, which results in edges 620 between the source node 610 and the sink nodes 612, 614 prior to layer assignment of those edges 620.

Schematic 604 illustrates the two-dimensional routing plan of the example network after selective application of non-default design rules NDR 1 and NDR 2 to the example network based on marking of edges of the example network based on edge distances from the source node 610. In particular, edge e0 has a distance of 1 to the source node 610, edge e1 has a distance of 2 to the source node 610, and edges e2 and e3 each has a distance of 3 to the source node 610. In accordance with various embodiments described herein, edges e2 and e3 are marked as tapering regions based on their distance of 3 and further based on a tapering parameter (e.g., set by a user).

Based on these tapering region markings, NDR 2 is applied to both edges e2 and e3 based on NDR 2 providing better timing cost for edges e2 and e3 than the application of NDR 1. In contrast, edges e0 and e1 are not marked as tapering regions, and NDR 1 is applied to both edges e0 and e1 based on NDR 1 providing a larger rule value than NDR 2.

Schematic 606 illustrates the edges e0, e1, e2, e3 of the example network after layer assignment and track assignment based on NDR 1 and NDR 2. In particular, schematic 606 illustrates how, based on the selective application of NDR 1 and NDR 2 to the example network (as shown by schematic 604), edges e0 and e1 are assigned to metal layer 5 (M5) based on application of NDR 1, edge e2 is assigned to metal layer 4 (M4) based on application of NDR 2, and edge e3 is assigned to metal layer 3 (M3) based on application of NDR 2.

Figure 7:
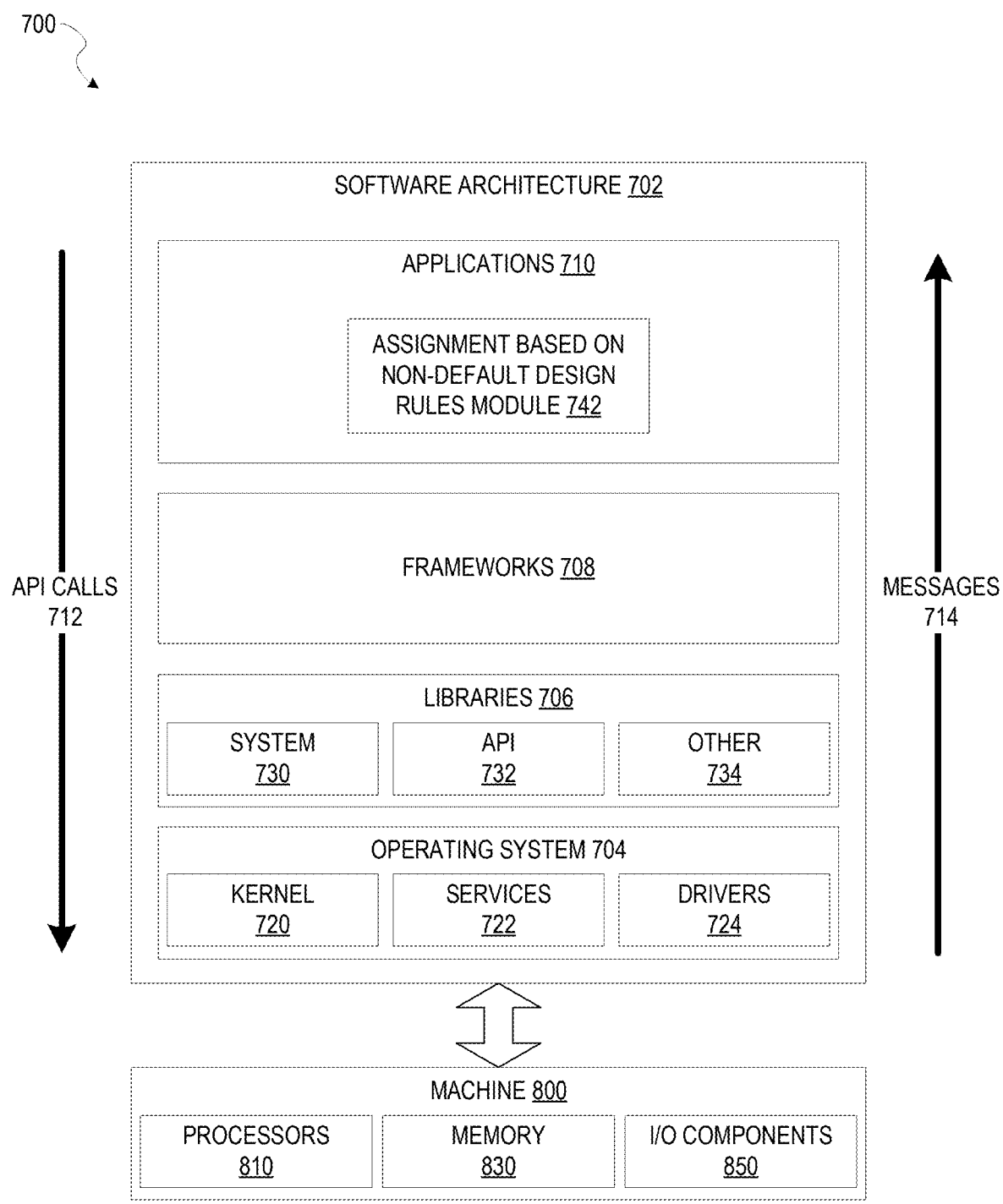
FIG. 7 is a block diagram illustrating an example of a software architecture that may be operating on an EDA computing device and may be used with methods for assignment of a network of a circuit design based on one or more non-default design rules, according to some embodiments.

FIG. 7 is a block diagram 700 illustrating an example of a software architecture 702 that may be operating on an EDA computer and may be used with methods for assignment of a network of a circuit design based on one or more non-default design rules, according to some embodiments. The software architecture 702 can be used as an EDA computing device to implement any of the methods described above. Aspects of the software architecture 702 may, in various embodiments, be used to store circuit designs, and to facilitate generation of a circuit design in an EDA environment by assignment (e.g., layer assignment, track assignment, or both) of a network of a circuit design based on one or more non-default design rules, from which physical devices may be generated.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 of FIG. 8 that includes processors 810 (e.g., hardware processors), memory 830, and input/output (I/O) components 850. In this example, the software architecture 702 can be conceptualized as a stack of layers where each layer may provide a particular functionality. For example, the software architecture 702 includes layers such as an operating system 704, libraries 706, software frameworks 708, and applications 710. Operationally, the applications 710 invoke application programming interface (API) calls 712 through the software stack and receive messages 714 in response to the API calls 712, consistent with some embodiments. In various embodiments, any client device, any server computer of a server system, or any other device described herein may operate using elements of the software architecture 702. An EDA computing device described herein may additionally be implemented using aspects of the software architecture 702, with the software architecture 702 adapted for operating to assignment (e.g., layer assignment, track assignment, or both) of network of a circuit design in any manner described herein.

In some embodiments, an EDA application of the applications 710 performs assignment (e.g., layer assignment, track assignment, or both) of a network of a circuit design based on one or more non-default design rules according to embodiments described herein using various modules within the software architecture 702. For example, in some embodiments, an EDA computing device similar to the machine 800 includes the memory 830 and the one or more processors 810. The processors 810 also implement an assignment based on non-default design rules module 742 (hereafter, the assignment module 742) for layer assignment, track assignment, or both of a network of a circuit design based on one or more non-default design rules, in accordance with various embodiments described herein.

In various other embodiments, rather than being implemented as modules of the one or more applications 710, the assignment module 742 may be implemented using elements of the libraries 706, the operating system 704, or the software frameworks 708.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionalities. The services 722 can provide other common services for the other software layers. The drivers 724 are responsible for controlling or interfacing with the underlying hardware, according to some embodiments. For instance, the drivers 724 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphic user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement layer assignment, track assignment, or both of a network of a circuit design based on one or more non-default design rules as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose hardware processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some embodiments, the processors 810 or processor-implemented modules are located in a single geographic location (e.g., within a home environment, an office environment, or a server farm). In some other embodiments, the processors or processor-implemented modules are distributed across a number of geographic locations.

Figure 8:
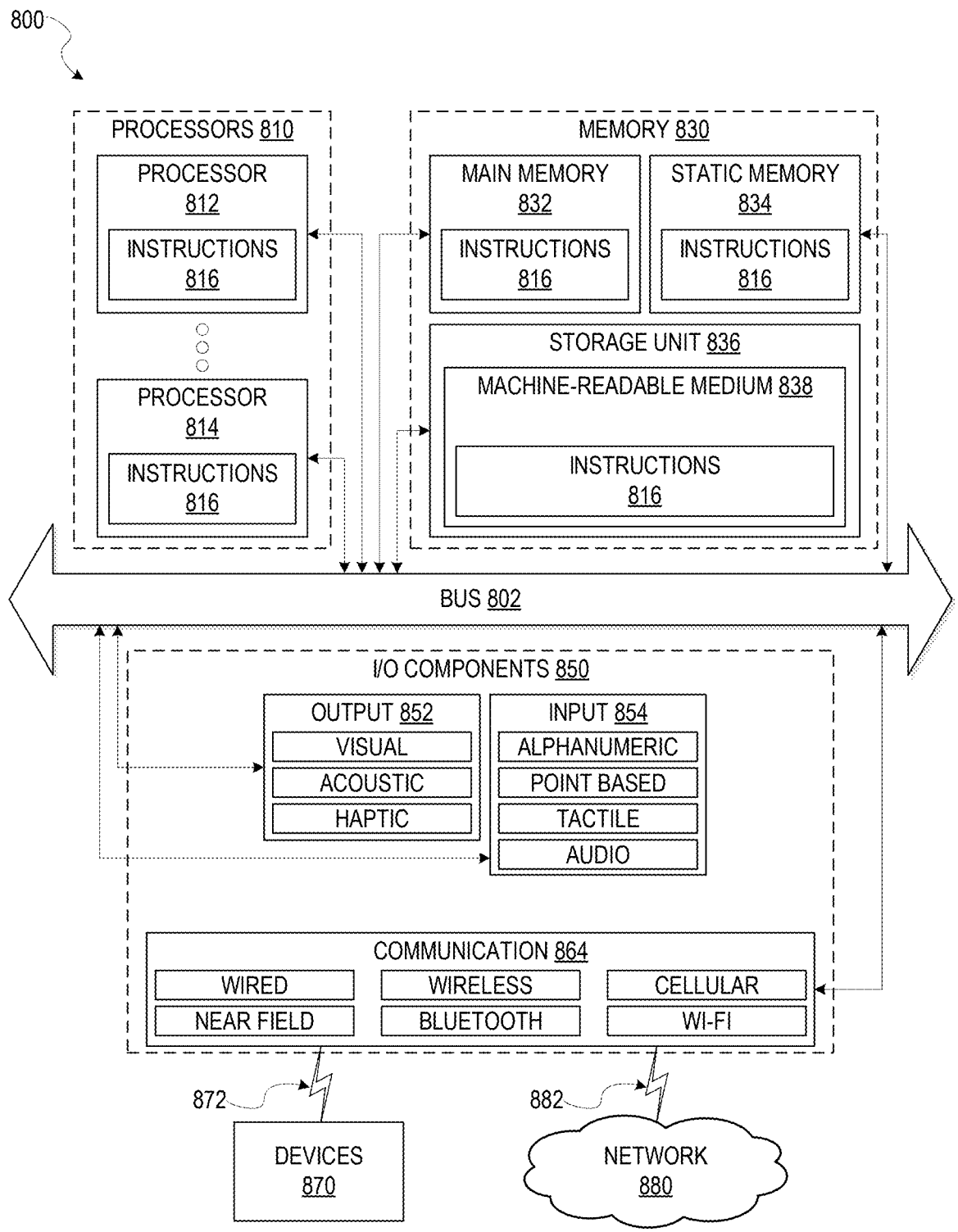
FIG. 8 is a diagram representing a machine in the form of a computer system within which a set of instructions are executed, causing the machine to perform any one or more of the methods discussed herein, according to some embodiments.

FIG. 8 is a diagrammatic representation of the machine 800 in the form of a computer system within which a set of instructions may be executed for causing the machine 800 to perform any one or more of the methodologies discussed herein, according to some embodiments. FIG. 8 shows components of the machine 800, which is, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In some embodiments, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in some embodiments, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

In various embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling.

Furthermore, the machine-readable medium 838 is non-transitory (in other words, not having any transitory signals) in that it does not embody a propagating signal. However, labeling the machine-readable medium 838 "non-transitory" should not be construed to mean that the machine-readable medium 838 is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a memory storing instructions; and
a hardware processor communicatively coupled to the memory and configured by the instructions to perform operations comprising:
accessing circuit design data that describes a set of networks of a circuit design;
performing a global routing process on the circuit design to generate a two-dimensional routing plan for the set of networks;
accessing a set of associations between a set of non-default design rules and a subset of the set of networks;
for each single network of the subset of networks, determining, based on the two-dimensional routing plan, a set of tapering regions for the single network based on a tapering parameter;
performing, based on the two-dimensional routing plan, the sets of tapering regions for the subset of networks, and the set of associations, a layer assignment operation on the circuit design to generate a set of layer assignments of edges of the set of networks to one or more layers of the circuit design; and
performing, based on the set of layer assignments, a track assignment operation on the circuit design to generate a set of track assignments of edges of the set of networks to one or more tracks of the circuit design.

2. The system of claim 1, wherein a non-default design rule in the set of non-default design rules is at least one of a minimum spacing rule or a minimum width rule.

3. The system of claim 1, wherein the set of associations comprises:
a first association between a first non-default design rule and a select network of the subset of networks; and
a second association between a second non-default design rule and the select network.

4. The system of claim 1, wherein the determining of the set of tapering regions for the single network based on the two-dimensional routing plan comprises:
generating a set of distances for the single network by determining, based on the two-dimensional routing plan, a distance between each single edge of the single network and a source node of the single network; and
determining the set of tapering regions for the single network by marking each single edge of the single network for tapering based on the tapering parameter and a distance of the single edge provided by the set of distances.

5. The system of claim 1, wherein the determining of the set of tapering regions for the single network based on the two-dimensional routing plan comprises:
sorting edges of the single network based on the two-dimensional routing plan to generate a sorted set of edges; and
based on an order of the sorted set of edges, for each select edge of the sorted set of edges:
generating a distance between the select edge and a source node of the single network; and
marking the select edge as a tapering region for the single network based on the tapering parameter and a distance of the single edge provided by the set of distances.

6. The system of claim 1, wherein the performing of the layer assignment operation on the circuit design based on the two-dimensional routing plan, the sets of tapering regions for the subset of networks, and the set of associations comprises:
for each select network of the subset of networks:
for each select edge of the select network:
determining whether the select edge is marked for tapering based on the sets of tapering regions for the subset of networks;
based on the determining of whether the select edge is marked for tapering, assigning, from a subset of non-default design rules associated with the select network, a select non-default design rule for the select edge that either provides a best timing cost in comparison to all other non-default design rules in the subset or that provides a largest rule value in comparison to all other non-default design rules in the subset;
generating a set of routing congestion costs of the select edge by determining, based on the select non-default design rule, a routing congestion cost for assigning the select edge to each layer of the circuit design; and
determining a layer assignment for the select edge based on the set of routing congestion costs; and
updating a routing demand of each select edge of the select network, based on the layer assignment of the select edge and the select non-default design rule of the select edge, to generate a set of updated routing demands.

7. The system of claim 6, wherein the assigning of the select non-default design rule for the select edge based on the determining of whether the select edge is marked for tapering comprises:
in response to the select edge being marked for tapering, assigning the select non-default design rule that provides the best timing cost in comparison to all other non-default design rules in the subset; and
in response to the select edge not being marked for tapering, assigning the select non-default design rule that provides the largest rule value in comparison to all other non-default design rules in the subset.

8. The system of claim 6, wherein the performing of the track assignment operation on the circuit design based on the set of layer assignments comprises:
for each individual network of the subset of networks:
for each individual edge of the individual network:
assigning the individual edge to a track, of an individual layer assigned to the individual edge, based on an individual non-default design rule assigned to the individual edge.

9. A non-transitory computer-readable medium comprising instructions that, when executed by a hardware processor of a device, cause the device to perform operations comprising:
performing a global routing process on a circuit design to generate a two-dimensional routing plan for a set of networks of the circuit design;
accessing a set of associations between a set of non-default design rules and a subset of the set of networks;

for each single network of the subset of networks, determining, based on the two-dimensional routing plan, a set of tapering regions for the single network based on a tapering parameter;
performing, based on the two-dimensional routing plan, the sets of tapering regions for the subset of networks, and the set of associations, a layer assignment operation on the circuit design to generate a set of layer assignments of edges of the set of networks to one or more layers of the circuit design; and
performing, based on the set of layer assignments, a track assignment operation on the circuit design to generate a set of track assignments of edges of the set of networks to one or more tracks of the circuit design.

10. The non-transitory computer-readable medium of claim 9, wherein a non-default design rule in the set of non-default design rules is at least one of a minimum spacing rule or a minimum width rule.

11. The non-transitory computer-readable medium of claim 9, wherein the set of associations comprises:
a first association between a first non-default design rule and a select network of the subset of networks; and
a second association between a second non-default design rule and the select network.

12. The non-transitory computer-readable medium of claim 9, wherein the determining of the set of tapering regions for the single network based on the two-dimensional routing plan comprises:
generating a set of distances for the single network by determining, based on the two-dimensional routing plan, a distance between each single edge of the single network and a source node of the single network; and
determining the set of tapering regions for the single network by marking each single edge of the single network for tapering based on a distance of the single edge provided by the set of distances.

13. The non-transitory computer-readable medium of claim 9, wherein the determining of the set of tapering regions for the single network based on the two-dimensional routing plan comprises:
sorting edges of the single network based on the two-dimensional routing plan to generate a sorted set of edges; and
based on an order of the sorted set of edges, for each select edge of the sorted set of edges:
generating a distance between the select edge and a source node of the single network; and
marking the select edge as a tapering region for the single network based on the tapering parameter and a distance of the single edge provided by the set of distances.

14. The non-transitory computer-readable medium of claim 9, wherein the performing of the layer assignment operation on the circuit design based on the two-dimensional routing plan, the sets of tapering regions for the subset of networks, and the set of associations comprises:
for each select network of the subset of networks:
for each select edge of the select network:
determining whether the select edge is marked for tapering based on the sets of tapering regions for the subset of networks; and
based on the determining of whether the select edge is marked for tapering, assigning, from a subset of non-default design rules associated with the select network, a select non-default design rule for the select edge that either provides a best timing cost in comparison to all other non-default design rules in the subset or that provides a largest rule value in comparison to all other non-default design rules in the subset;
generating a set of routing congestion costs of the select edge by determining, based on the select non-default design rule, a routing congestion cost for assigning the select edge to each layer of the circuit design; and
determining a layer assignment for the select edge based on the set of routing congestion costs; and
updating a routing demand of each select edge of the select network, based on the layer assignment of the select edge and the select non-default design rule of the select edge, to generate a set of updated routing demands.

15. The non-transitory computer-readable medium of claim 14, wherein the assigning of the select non-default design rule for the select edge based on the determining of whether the select edge is marked for tapering comprises:
in response to the select edge being marked for tapering, assigning the select non-default design rule that provides the best timing cost in comparison to all other non-default design rules in the subset; and
in response to the select edge not being marked for tapering, assigning the select non-default design rule that provides the largest rule value in comparison to all other non-default design rules in the subset.

16. The non-transitory computer-readable medium of claim 14, wherein the performing of the track assignment operation on the circuit design based on the set of layer assignments comprises:
for each individual network of the subset of networks:
for each individual edge of the individual network:
assigning the individual edge to a track, of an individual layer assigned to the individual edge, based on an individual non-default design rule assigned to the individual edge.

17. A method comprising:
performing a global routing process on a circuit design to generate a two-dimensional routing plan for a set of networks of the circuit design;
accessing a set of associations between a set of non-default design rules and a subset of the set of networks;
for each single network of the subset of networks, determining, based on the two-dimensional routing plan, a set of tapering regions for the single network based on a tapering parameter;
performing, based on the two-dimensional routing plan, the set of tapering regions for the subset of networks, and the set of associations, a layer assignment operation on the circuit design to generate a set of layer assignments of edges of the set of networks to one or more layers of the circuit design; and
performing, based on the set of layer assignments, a track assignment operation on the circuit design to generate a set of track assignments of edges of the set of networks to one or more tracks of the circuit design.

18. The method of claim 17, wherein a non-default design rule in the set of non-default design rules is at least one of a minimum spacing rule or a minimum width rule.

19. The method of claim 17, wherein the set of associations comprises:
a first association between a first non-default design rule and a select network of the subset of networks; and
a second association between a second non-default design rule and the select network.

20. The method of claim 17, wherein the determining of the set of tapering regions for the single network based on the two-dimensional routing plan comprises:

generating a set of distances for the single network by determining, based on the two-dimensional routing plan, a distance between each single edge of the single network and a source node of the single network; and
determining the set of tapering regions for the single network by marking each single edge of the single network for tapering based on a distance of the single edge provided by the set of distances.

* * * * *